United States Patent
Baumgartner et al.

(10) Patent No.: US 7,650,127 B2
(45) Date of Patent: Jan. 19, 2010

(54) GAIN CONTROLLED EXTERNAL LOW NOISE AMPLIFIER

(75) Inventors: Josef Baumgartner, Vienna (AT); Nahel Eshaq, Warren, MI (US); Brian Marlett, Macomb, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 643 days.

(21) Appl. No.: 11/284,462

(22) Filed: Nov. 21, 2005

(65) Prior Publication Data

US 2006/0154634 A1 Jul. 13, 2006

Related U.S. Application Data

(60) Provisional application No. 60/642,724, filed on Jan. 10, 2005.

(51) Int. Cl.
*H04B 1/06* (2006.01)

(52) U.S. Cl. .............................. 455/234.1; 455/245.1
(58) Field of Classification Search .................. None
See application file for complete search history.

(56) References Cited

U.S. PATENT DOCUMENTS

| | | | | |
|---|---|---|---|---|
| 5,862,465 | A * | 1/1999 | Ou | 455/234.1 |
| 6,657,536 | B1 * | 12/2003 | Avenel | 340/5.61 |
| 6,965,655 | B1 * | 11/2005 | Mostov et al. | 375/345 |
| 2002/0119761 | A1 * | 8/2002 | Matsumoto | 455/140 |

* cited by examiner

*Primary Examiner*—Thanh C Le

(57) ABSTRACT

A receiver for receiving radio frequency signals from a remote keyless entry system and another system includes a low noise amplifier for amplifying and increasing the range and sensitivity of the receiver, such that the receiver may receive signals at increased distances. A gain of the low noise amplifier is selectively controlled to cycle from a first gain level that provides for increased sensitivity and a second gain level that provides a lower sensitivity and a greater dynamic range or larger signal capacity.

13 Claims, 1 Drawing Sheet

GAIN CONTROLLED EXTERNAL LOW NOISE AMPLIFIER

CROSS REFERENCE TO RELATED APPLICATION

This application claims priority to U.S. Provisional Application No. 60/642,724, which was filed on Jan. 10, 2005.

BACKGROUND OF THE INVENTION

This invention generally relates to a method and device for receiving input signals with a receiver from multiple systems. More particularly, this invention relates to a method of operating a low noise amplifier for a receiver receiving input from multiple systems.

A receiver for automotive system applications typically receives signals for a remote keyless entry system. In many instances it is desirable for the receiver to recognize and receive signals from a remote transmitter at increased distances. An external low noise amplifier (LNA) installed with the receiver provides increased signal sensitivity that translates into the capability of receiving signals from increased distances. The LNA provides an increased gain to surrounding signals that increases the range and sensitivity of the receiver.

Disadvantageously, the increased gain provided by the external LNA reduces large signal capability and therefore increases the probability that the receiver is blocked by an interfering signal. Many receivers are utilized for multiple automotive systems such as both a remote keyless entry system and a tire pressure monitoring system. The signals from the tire pressure monitoring system do not require amplification, as they are located on the vehicle. However, external interference received by the receiver due to the increased sensitivity provided by the LNA system could cause undesirable interference with such signals.

Accordingly, it is desirable to develop a method of controlling an external low noise amplifier to provide the desired increase in receiver range and sensitivity while also providing reliable receipt of other signals.

SUMMARY OF THE INVENTION

An example receiver according to this invention includes an external low noise amplifier that is controlled to operate between a first high gain and a second lower gain.

An example receiver is provided for receiving a radio frequency signal from a remote keyless entry (RKE) system and another system. The receiver includes a low noise amplifier for amplifying and increasing the range and sensitivity of the receiver, such that the receiver may receive signals at increased distances. A gain of the low noise amplifier is adjusted in view of a signal strength measured by a received signal strength indicator. The low noise amplifier increases the sensitivity of the receiver to external signals, providing for weaker signals to be received and recognized.

The low noise amplifier is selectively controlled to cycle from a first gain level that provides for increased sensitivity and a second gain level that provides a lower sensitivity and a greater dynamic range or large signal capacity. Cycling between the first gain level and the second gain level occurs responsive to a triggering event.

Accordingly, the method and device according to this invention controls the gain level of the external low noise amplifier to increase receiver sensitivity and thereby remote transmitter range, while maintaining reliable operation and large signal capability.

These and other features of the present invention can be best understood from the following specification and drawings, the following of which is a brief description.

DETAILED DESCRIPTION OF THE PREFERRED EMBODIMENT

Figure 1:
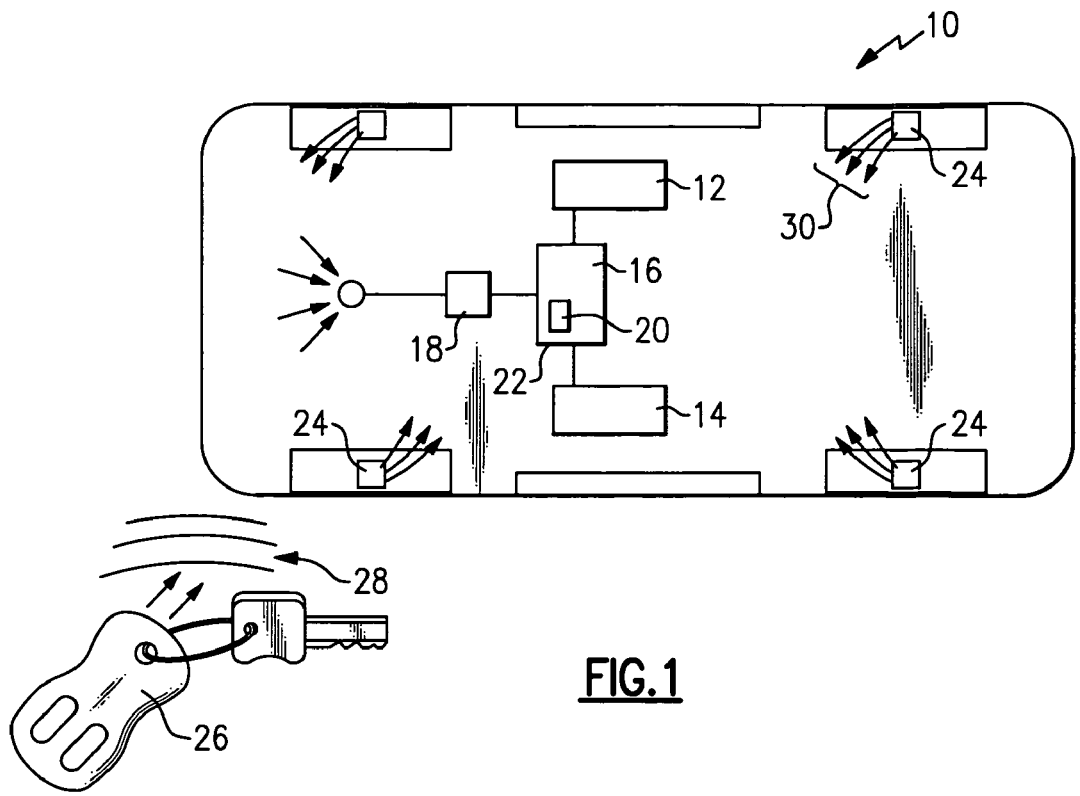
FIG. 1 is a schematic representation of a vehicle including an example receiver and low noise amplifier according to this invention.

Referring to FIG. 1, a motor vehicle 10 includes a remote keyless entry system (RKE) 12 and a tire pressure monitoring (TPM) system 14. A receiver 16 is provided for receiving radio frequency signals from both the RKE system 12 and the TPM system 14. The receiver 16 includes an external low noise amplifier 18 for amplifying and increasing the range and sensitivity of the receiver 16, such that the receiver 16 may receive signals at increased distances. A gain of the low noise amplifier 18 can be adjusted according to a measured signal strength measured by a received signal strength indicator 20 that is integral with the receiver 16.

The RKE system 12 includes a remote transmitter 26 that transmits a signal 28. A distance at which the signal 28 can be read between the receiver 16 and the remote transmitter 26 is increased by the externally mounted low noise amplifier 18. The low noise amplifier 18 increases the sensitivity of the receiver 16 to external signals, providing for weaker signals to be received and recognized. Receiving weaker signals provides for receipt of RKE signals 28 at an increased distance. This provides a desirable increase in range at which signal from the remote transmitter 26 are recognized and acted on by the RKE system 12 of the vehicle 10.

Unfortunately, the increase in sensitivity provided by the low noise amplifier 18 also results in a decrease in the large signal capability of the receiver 16. The addition of the external low noise amplifier 18 decreases the dynamic range of the receiver 16. As a result interfering external signals can easily block the receiver thus decreasing the range at which wanted signals can be received to zero.

In the example vehicle 10 the increase in gain provided by the low noise amplifier 18 increases the range at which the RKE signal 28 can be received, but can in some instances result in the inability to receive a TPM signal 30 emitted by individual TPM sensors 24 installed on the vehicle 10. The low noise amplifier 18 is therefore controlled to cycle between a first gain level that increases the range at which the RKE signal 28 can be received and a second gain lower than the first gain level to provide for receipt of TPM signals 30. Although an RKE signal and a TPM signal are discussed and illustrated as examples, receivers that receive signals for other systems will benefit from this invention, and one knowledgeable in the art will recognize that other such systems are within the contemplation of this invention.

The example receiver 16 is disposed as part of an integrated circuit 22 and includes a received signal strength indicator 20. The received signal strength indicator 20 provides information to the integrated circuit 22 indicative of signal strength. A signal from the received signal strength indicator 20 is low pass filtered to provide time averaging. This information is then utilized to control the gain level for the low noise amplifier 18.

The low noise amplifier 18 is selectively controlled to cycle from a first gain level that provides for increased sensitivity and a second gain level that provides a lower sensitivity and a greater dynamic range or large signal capacity. Cycling between the first gain level and the second gain level occurs responsive to a triggering event. The triggering event can be a positive activation such as the opening of a car door, or insertion of a key into the ignition. Such events indicate that an operator is within or very near the vehicle and therefore increased range is not required. The gain provided by the low noise amplifier 18 can therefore be reduced to the second lower level to provide reliable receipt of signals such as the TPM signals 30.

The triggering event may also comprise a signal strength received from the remote transmitter 26. As appreciated, as the remote transmitter 26 is moved closer to the receiver, the measured signal strength as is received by the received signal strength indicator 20 increases. After obtaining a desired signal strength threshold value, the low noise amplifier 18 is switched to the lower gain level. As should be understood, a number of ways of triggering cycling between gain levels of the low noise amplifier are within the contemplation of this invention.

Figure 2:
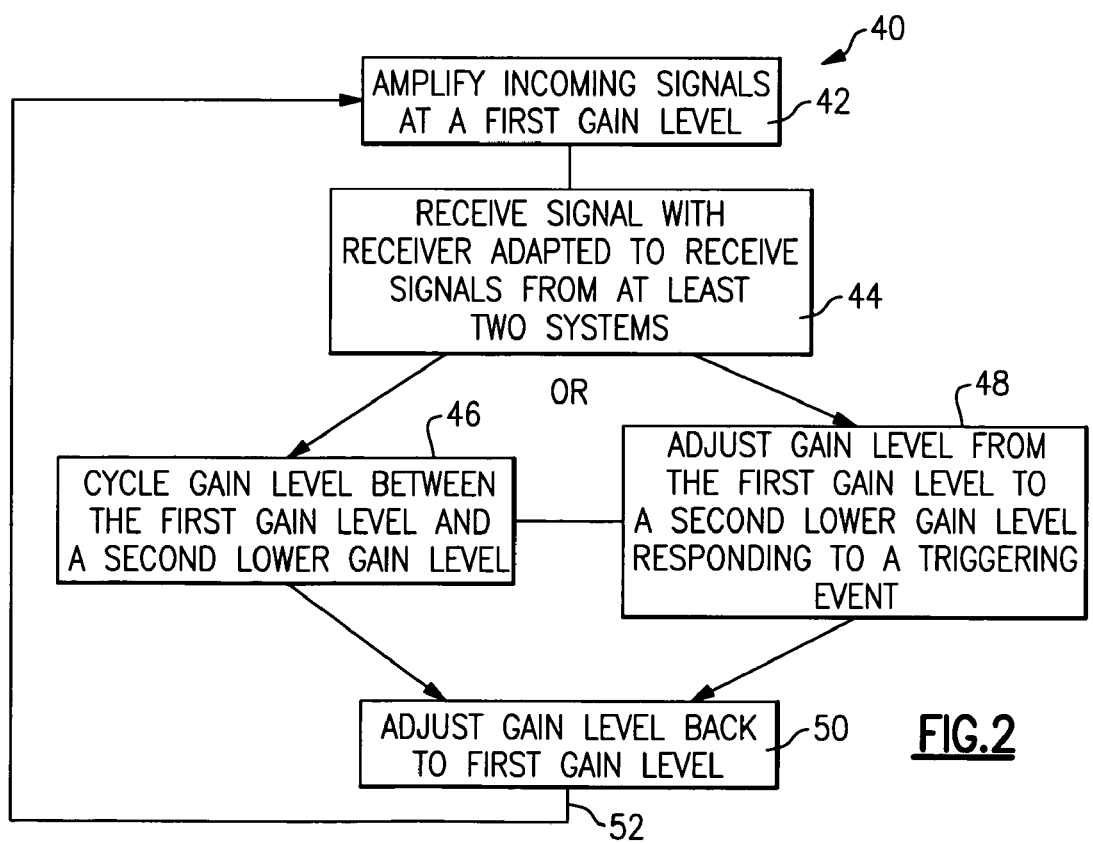
FIG. 2 is a block diagram illustrating example method steps according to this invention.

Referring to FIG. 2, operation of the receiver 18 is schematically illustrated by block diagram 40 and includes the amplification of incoming signals according to a first gain level provided by the low noise amplifier 18 as is indicated at 42. The amplified incoming signal is sent to the receiver 16 and the strength of that signal noted as is indicated at 44. The receiver 16 is adapted to receive signals from at least two different systems. As appreciated, of the at least two systems, only the RKE system 12 requires signal amplification for improved operation. Other systems disposed on the vehicle 10 such as the TPM system 14 operates as desired without significant signal amplification.

The gain of the low noise amplifier 18 can either be selectively adjusted to a lower second gain level responsive to a triggering event as is indicated at 48 or cycled between the first higher gain level and the lower second gain level responsive to a specific time interval. Further, the low noise amplifier 18 may be operated utilizing a combination of cycling and switching responsive to the received signal strength. As appreciated, the receiver 16 can be cycled between first and second gain levels at specified time intervals, and then switched to the low gain level responsive to a triggering event such as the receipt of a signal above a desired strength.

Once the low gain level is selected another event such as a lapse of time or an exit from the vehicle indicated by the vehicle being turned off, the low noise amplifier 18 can be cycled back to the first higher gain level as is indicated at 50. Operation would then repeat the method steps as indicated at 52 until another triggering event or expiration of a desired time interval.

Accordingly, the method and device according to this invention controls the gain level of the external low noise amplifier 18 to increase receiver sensitivity and thereby remote transmitter range, while maintaining reliable operation and large signal capability.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of operating a receiver comprising the steps of:
    a) searching for one of at least two possible incoming signals with a low noise amplifier of a receiver;
    b) receiving a signal from a remote keyless entry system and at least one other system
    c) cycling a gain provided by the low noise amplifier between a high value and a low value at a desired time interval; and
    d) automatically adjusting the gain provided by the low noise amplifier to the low value responsive to a triggering event.

2. The method as recited in claim 1, including triggering a reduction in a gain provided by the low noise amplifier responsive to receiving a signal from the at least one other system.

3. The method as recited in claim 1, including adjusting the gain of the low noise amplifier responsive to a signal strength received above a desired threshold value.

4. The method as recited in claim 3, including utilizing a received signal strength indicator of the receiver to control the low noise amplifier.

5. The method are recited in claim 1, wherein the at least one other system comprises a tire pressure monitoring system disposed on a motor vehicle.

6. The method as recited in claim 5, including triggering a reduction in gain of the low noise amplifier responsive to opening of a door to the motor vehicle.

7. A method of operating a receiver for a remote keyless entry system and at least one other system comprising the steps of:
    a) amplifying an incoming signal from a remote transmitter to improve an effective operational range of the receiver with a low noise amplifier;
    b) sensing a signal strength with a signal strength indicator within the receiver; and
    c) reducing amplification provided by the low noise amplifier from a first level to a second lower level responsive to a triggering event, wherein the triggering event is indicative of the remote transmitter being within a range not requiring the improved effective operational range of the receiver.

8. The method as recited in claim 7, wherein the triggering event comprises receiving a signal greater than a desired threshold value.

9. The method as recited in claim 8, wherein the triggering event comprises opening of an entry door to a motor vehicle.

10. The method as recited in claim 8, wherein the triggering event comprise receipt of a signal from the remote transmitter greater than a desired threshold value.

11. The method as recited in claim 8, including the step of cycling between a first high amplification level and a second low amplification level.

12. A receiver for a remote keyless entry system of a motor vehicle comprising:
    a low noise amplifier for amplifying an incoming signal;
    a signal strength indicator for measuring a strength of the incoming signal; and a controller for adjusting a level of gain for the amplification of an incoming signal responsive to a triggering event indicative of an expected increase in signal strength from an incoming signal from the remote keyless entry system, wherein the receiver receives signals from the remote keyless entry system and at least one other system.

13. The receiver as recited in claim 12, wherein the remote keyless entry system includes a remote transmitter, and the low noise amplifier increases an effective range of the remote transmitter.

* * * * *

UNITED STATES PATENT AND TRADEMARK OFFICE
CERTIFICATE OF CORRECTION

| | | |
|---|---|---|
| PATENT NO. | : 7,650,127 B2 | Page 1 of 1 |
| APPLICATION NO. | : 11/284462 | |
| DATED | : January 19, 2010 | |
| INVENTOR(S) | : Baumgartner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Twenty-eighth Day of December, 2010

David J. Kappos
*Director of the United States Patent and Trademark Office*